(12) United States Patent
Misso et al.

(10) Patent No.: US 6,424,488 B1
(45) Date of Patent: Jul. 23, 2002

(54) PERIPHERALLY EXTENDING DISC RING TO LIMIT DISC DEFLECTION AND TO PROVIDE DISC STACK BALANCING

(75) Inventors: Nigel F. Misso, Bethany; Curtis A. Trammell, Newcastle, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/510,445

(22) Filed: Feb. 21, 2000

Related U.S. Application Data

(60) Provisional application No. 60/121,166, filed on Feb. 22, 1999.

(51) Int. Cl.$^7$ .............................................. G11B 17/02
(52) U.S. Cl. ................................ 360/98.08; 360/97.03; 360/133; 360/135
(58) Field of Search ......................... 360/97.02, 98.01, 360/97.01, 98.08, 99.12, 133, 135, 97.03

(56) References Cited

U.S. PATENT DOCUMENTS

| | | | | |
|---|---|---|---|---|
| 3,805,292 A | | 4/1974 | Hashiguchi et al. ......... 360/135 |
| 4,013,296 A | | 3/1977 | Keeney .................... 274/42 R |
| 4,387,807 A | | 6/1983 | de la Rosa ................. 206/312 |
| 4,510,508 A | | 4/1985 | Janssen .................... 346/135.1 |
| 4,546,464 A | | 10/1985 | Inoue et al. ................ 369/280 |
| RE32,193 E | | 6/1986 | Knoop et al. ............... 360/135 |
| 4,622,661 A | | 11/1986 | Hoogeveen et al. ......... 369/280 |
| 5,130,870 A | | 7/1992 | Jabbari .................... 360/99.08 |
| 5,555,144 A | | 9/1996 | Wood et al. ............... 360/98.08 |
| 5,621,588 A | * | 4/1997 | Williams et al. .......... 360/98.07 |
| 5,801,899 A | | 9/1998 | Genheimer ............... 360/97.01 |
| 5,987,003 A | * | 11/1999 | Yokota ........................ 369/280 |
| 6,055,140 A | * | 4/2000 | Marchon .................... 360/135 |
| 6,125,098 A | * | 9/2000 | Osawa ........................ 369/266 |
| 6,178,063 B1 | * | 1/2001 | Wood et al. .............. 360/98.08 |
| 6,214,430 B1 | * | 4/2001 | Kim et al. .................. 428/64.1 |
| 6,249,509 B1 | * | 6/2001 | Hirata et al. .............. 369/275.5 |

FOREIGN PATENT DOCUMENTS

| | | | |
|---|---|---|---|
| JP | 57-66530 | * | 4/1982 |
| JP | 59-60736 | * | 4/1984 |
| JP | 60-85436 | * | 5/1985 |
| JP | 2000-65092 | * | 3/2000 |

* cited by examiner

*Primary Examiner*—Jefferson Evans
(74) *Attorney, Agent, or Firm*—Crowe & Dunlevy

(57) ABSTRACT

Apparatus and method for balancing and limiting deflection of a disc of a disc drive. A disc stack comprises a spindle motor hub rotatable about a central axis, a disc mounted to the spindle motor hub, and a circumferentially extending peripheral disc ring affixed to an outermost peripheral surface of the disc. Imbalance of the disc stack is measured, and portions of the peripheral disc ring are removed in relation to the measured imbalance of the disc stack to nominally balance the disc stack. The disc ring protects the disc drive by cushioning contact between the disc and a rigid actuator arm supporting a head adjacent the disc.

8 Claims, 3 Drawing Sheets

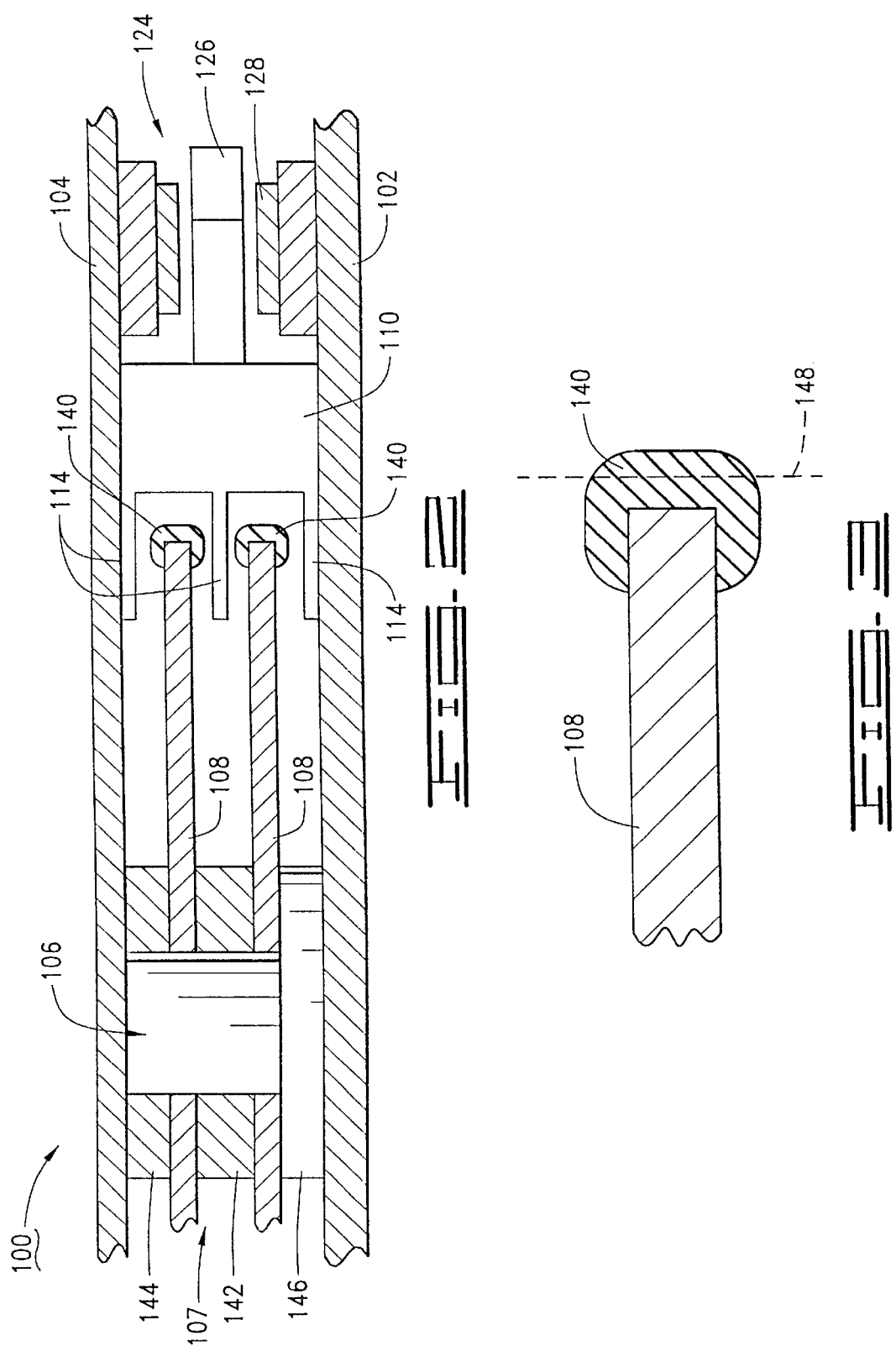

US 6,424,488 B1

PERIPHERALLY EXTENDING DISC RING TO LIMIT DISC DEFLECTION AND TO PROVIDE DISC STACK BALANCING

RELATED APPLICATIONS

This application claims priority to U.S. Provisional Application No. 60/121,166 filed Feb. 22, 1999.

FIELD OF THE INVENTION

This invention relates generally to the field of magnetic data storage devices, and more particularly, but not by way of limitation, to improving disc drive assembly and operation through the use of a peripherally extending disc ring affixed to the outermost diameter of each disc in the disc drive.

BACKGROUND

Disc drives are used as primary data storage devices in modern computer systems and networks. A typical disc drive comprises one or more rigid magnetic storage discs which are journaled about a spindle motor hub to form a rotatable disc stack. An array of read/write transducing heads are provided to transfer data between tracks of the discs and a host computer in which the disc drive is mounted.

High performance disc drives of the present generation rotate the discs at speeds measured in the thousands of revolutions per minute. It is therefore desirable to achieve nominal balance in a disc stack to ensure that data are written and read in a reliable manner and to prevent the generation of undesired vibrations during operation. Disc drive manufacturers typically balance disc stacks by measuring translational and rotational imbalance and then adding one or more discrete weights to the hub of the spindle motor, such as discussed in U.S. Pat. No. 5,130,870 issued to Jabbari and U.S. Pat. No. 5,555,144 issued to Wood et al.

At the same time, disc drives are becoming increasingly smaller and store greater amounts of data, leading to smaller disc thicknesses, closer disc spacings and more delicate read/write heads. Mechanical shocks applied to the drives thus increase the potential for damage as the discs are deflected and contact the rigid actuator arms used to support the heads. Manufacturers have attempted to limit this deflection through the use of deflection limiters (snubbers), such as disclosed in U.S. Pat. No. 5,801,899 issued to Genheimer.

While operable, as rotational speeds and track densities increase, there remains a continued need for improved methodologies for providing disc stack balancing and mechanical shock resistance. It is to such improvements that the present invention is directed.

SUMMARY OF THE INVENTION

The present invention provides an apparatus and method for balancing and limiting deflection of a disc stack of a disc drive.

In accordance with preferred embodiments, a disc stack comprises a hub of a spindle motor rotatable about a central axis, one or more discs mounted to the spindle motor hub, and a circumferentially extending peripheral disc ring affixed to an outermost peripheral surface of each disc. After the disc stack is assembled, the imbalance of the disc stack is measured, and portions of the peripheral disc ring are removed in relation to the measured imbalance of the disc stack to nominally balance the disc stack.

Unlike prior art approaches which use a range of discrete weights, substantially nominal balancing can be obtained since the rings can be precisely trimmed in a continuous fashion. Also, the placement of the weights at the outermost circumferences of the discs generally promotes better balancing control as compared to discrete weights placed on the spindle motor hub. The dual function of the rings as both balancers and snubbers reduces part count and assembly time, leading to savings in material and labor costs depending on the extent to which the installation and trimming operation can be automated.

These and various other features and advantages which characterize the present invention will be apparent from a reading of the following detailed description and a review of the associated drawings.

BRIEF DESCRIPTION OF THE DRAWINGS

FIG. 2 is an elevational, partial cross-sectional view of the disc drive of FIG. 1.

FIG. 3 shows the peripheral disc ring of FIGS. 1 and 2 in greater detail.

DETAILED DESCRIPTION

Figure 1:
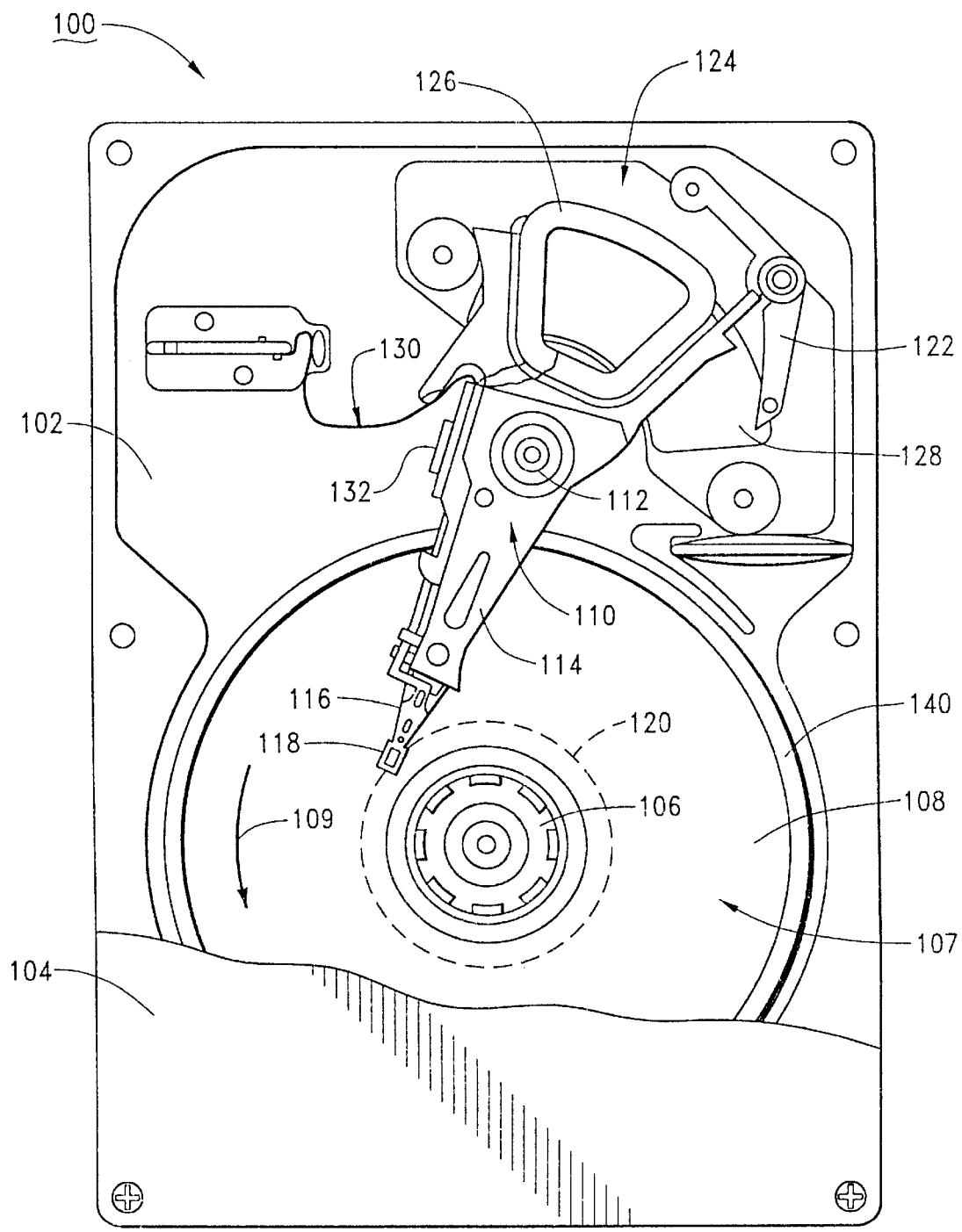
FIG. 1 is a top plan view of a disc drive illustrating the use of peripheral disc rings in accordance with preferred embodiments of the present invention.

Referring to FIG. 1, shown therein is a top plan view of a disc drive 100 used to store computerized data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor 106 rotates a disc stack 107 comprising a plurality of magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 adjacent the discs 108. The actuator assembly 110 includes a plurality of rigid actuator arms 114 which support flexible suspension assemblies 116 (flexures). A head 118 is supported at the end of each flexure 116, with the heads preferably having a magneto-resistive (MR) construction.

When the disc drive 100 is not in use, the heads 118 are parked on landing zones 120 and the actuator assembly 110 is secured using a magnetic latch assembly 122. A voice coil motor (VCM) 124 controls the position of the heads 118 through application of current to a coil 126 which interacts with a magnetic circuit which includes a permanent magnet 128. A flex assembly 130 facilitates electrical communication between the actuator assembly 110 and a disc drive printed circuit board (PCB) mounted to the underside of the base deck 102. The flex assembly 130 includes a preamplifier/driver circuit 132 that interfaces with the heads 118.

Of particular interest are a plurality of peripheral disc rings 140, which circumferentially extend about the periphery of each of the discs 108 of the disc stack 107 to facilitate disc stack balancing and to limit deflection of the discs 108 in response to the application of mechanical shocks to the disc drive in a direction parallel to the axis of disc rotation (z-axis). The peripheral disc rings 140 are shown more particularly in FIG. 2 to have a substantially c-shaped cross-section for engagement with the peripheral edges of the discs 108.

The peripheral disc rings 140 are formed from a suitable compliant material, such as rubber, and reduce damage to the discs 108, actuator arms 114 and heads 118 in response to z-axis shocks sufficient to cause the peripheral disc rings to contact the rigid actuator arms. It will be noted that the flexures 116 and heads 118 have been omitted from FIG. 2 for purposes of clarity. The disc stack 107 is shown to comprise two discs 108, although the present invention is not so limited. A disc spacer 142 is disposed between the disc 108 and a clamp 144 exerts an axially directed clamping force to secure the discs 108 and the disc spacer 142 between the clamp and a spindle motor flange 146.

Figure 4:
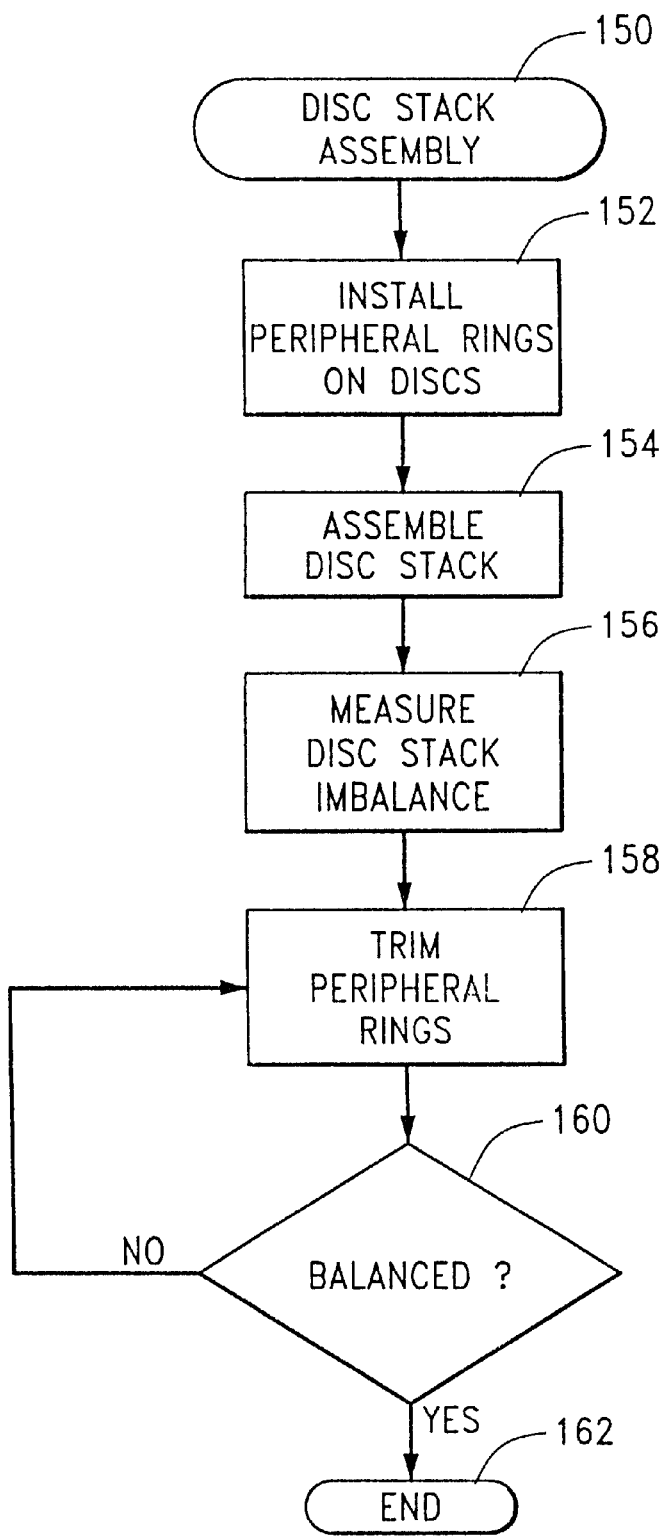
FIG. 4 is a flow chart for a DISC STACK ASSEMBLY routine, illustrating steps carried out in accordance with preferred embodiments of the present invention.

The peripheral disc rings 140 are preferably configured to fit over the peripheral edges and outermost portions of the top and bottom surfaces of the discs 108 as shown more clearly in FIG. 4. Each peripheral disc ring 140 is preferably elastomeric and sized appropriately so as to exert an inwardly directed spring force to retain the ring on the disc 108. Alternatively, a suitable adhesive can be applied to retain the ring on the disc 108. Small portions of the peripheral disc ring 140 can be removed (as represented by broken line 148) at selected locations to achieve proper balancing of the disc stack 107.

FIG. 4 provides a flow chart for a DISC STACK ASSEMBLY routine 150, illustrating steps carried out in accordance with preferred embodiments to incorporate the peripheral disc rings 140 in the disc stack 107 during a disc drive manufacturing operation. At step 152, the peripheral disc rings 140 are first installed onto the discs 108, after which the disc stack is assembled at step 154. As will be recognized, this assembly step generally comprises placing the first disc 108 over the hub of the spindle motor 106 so that the disc 108 comes to rest on the spindle hub flange 146, placing the disc spacer 142 onto the first disc, placing the second disc onto the first disc, and then installing the disc clamp 144 with the desired amount of axial loading.

At step 156, the disc stack is next rotated and the imbalance is measured. The peripheral disc rings 140 are then trimmed (ablated) at step 158 using a suitable trimming operation, such as through the use of a laser, high pressure water jet, or bladed cutting tool to remove the appropriate amount of material from the peripheral disc rings 140 to achieve proper balance. It will be appreciated that a vacuum port is desirable to remove particulates generated during the trimming operation of step 158.

The imbalance of the disc stack 107 is again measured and, as shown by decision step 160, additional trimming is applied as required to achieve proper balance of the disc stack 107, after which the routine ends at step 162.

An advantage of the present invention, as embodied herein, is the balancing precision achievable through the metered removal of mass from the rings 140. Unlike prior art approaches which use a range of discrete weights, substantially nominal balancing can be obtained since the rings 140 can be precisely trimmed in a continuous fashion. Also, the placement of the weights at the outermost circumferences of the discs generally promotes better balancing control. Moreover, the dual function of the rings 140 as both balancers and snubbers reduces part count and assembly time, leading to savings in material and labor costs depending on the extent to which the installation and trimming operation is automated.

In accordance with the foregoing discussion, it will now be recognized that the present invention is directed to an apparatus and method for balancing and limiting deflection of a disc stack 107 of a disc drive 100. The disc stack 107 comprises a hub of a spindle motor 106 rotatable about a central axis, a disc 108 mounted to the spindle motor hub, and a circumferentially extending peripheral disc ring 140 affixed to an outermost peripheral surface of the disc. Imbalance of the disc stack is measured (step 156), and portions of the peripheral disc ring are removed in relation to the measured imbalance of the disc stack to nominally balance the disc stack (step 158).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for balancing a disc drive disc stack comprising at least one rotatable disc mounted to a hub of a spindle motor, comprising steps of:

(a) applying a circumferentially extending peripheral disc ring to an outermost peripheral surface of the disc;

(b) measuring imbalance of the disc stack; and (c) removing portions of the peripheral disc ring in relation to the measured imbalance of the disc stack to nominally balance the disc stack.

2. The method of claim 1, wherein the peripheral disc ring of applying step (a) comprises a generally c-shaped cross section so that the peripheral disc ring abuts the outermost peripheral surface of the disc as well as adjoining portions of surfaces of the disc aligned along planes substantially normal to an axis of rotation of the disc.

3. The method of claim 2, further comprising a step of:

(d) mounting the disc stack to a base deck of a disc drive; and (e) mounting an actuator assembly to the base deck adjacent the disc stack, the actuator assembly including a rigid actuator arm which supports a read/write head adjacent the disc, wherein the peripheral disc ring comprises a compliant material to reduce damage to the disc drive through contact between the peripheral disc ring and the actuator arm as a result of deflection of the disc in response to the application of a mechanical shock to the disc drive.

4. A disc stack for use in a disc drive, comprising:

a spindle motor hub rotatable about a central axis;

a disc mounted to the spindle motor hub; and a circumferentially extending peripheral disc ring affixed to an outermost peripheral surface of the disc, the peripheral disc ring comprising a compliant material configured to provide nominal balancing of the disc stack as the spindle motor hub rotates about the central axis and to limit deflection of the disc in response to application of a mechanical shock to the disc drive.

5. The disc stack of claim 4, wherein the peripheral disc ring comprises a generally c-shaped cross section so that the peripheral disc ring abuts the outermost peripheral surface of the disc as well as adjoining portions of surfaces of the disc aligned along planes substantially normal to an axis of rotation of the disc.

6. A disc drive, comprising:

a rotatable disc; and balance means for balancing the disc.

7. The disc drive of claim 6, further comprising a disc stack comprising a spindle motor hub rotatable about a central axis, wherein the disc is mounted to the spindle motor hub, and wherein the balance means comprises a circumferentially extending peripheral disc ring affixed to an outermost peripheral surface of the disc, the peripheral disc ring comprising a compliant material configured to provide nominal balancing of the disc stack as the spindle motor hub rotates about the central axis and to limit deflection of the disc in response to application of a mechanical shock to the disc drive.

8. The disc drive of claim 7, further comprising an actuator assembly comprising a rigid actuator arm supporting a head adjacent the disc, wherein the peripheral disc ring reduces damage to the disc drive through contact between the peripheral disc ring and the actuator arm as a result of deflection of the disc in response to the application of a mechanical shock to the disc drive.

* * * * *